(12) United States Patent
Bieri et al.

(10) Patent No.: US 8,790,447 B2  
(45) Date of Patent: Jul. 29, 2014

(54) SEPARATION DEVICE FOR REMOVING LIQUID FROM A MIXTURE COMPRISING A GAS AND LIQUID

(75) Inventors: Hans Bieri, Wintherthur (CH); Youcef Ait Bouziad, Wintherthur (CH); Nicolas Martin, Wintherthur (CH); Rick Van Der Vaart, Rijswijk (NL)

(73) Assignee: Shell Oil Company, Houston, TX (US)

(*) Notice: Subject to any disclaimer, the term of this patent is extended or adjusted under 35 U.S.C. 154(b) by 316 days.

(21) Appl. No.: 13/266,690

(22) PCT Filed: Apr. 27, 2010

(86) PCT No.: PCT/EP2010/055614  
§ 371 (c)(1),  
(2), (4) Date: Nov. 30, 2011

(87) PCT Pub. No.: WO2010/125055  
PCT Pub. Date: Nov. 4, 2010

(65) Prior Publication Data  
US 2012/0060691 A1 Mar. 15, 2012

(30) Foreign Application Priority Data  
Apr. 29, 2009 (EP) .................................. 09159088.5  
Apr. 29, 2009 (EP) .................................. 09159097.6

(51) Int. Cl.  
*B01D 45/12* (2006.01)

(52) U.S. Cl.  
USPC ................ 95/270; 55/317; 55/447; 55/459.1; 55/456; 55/400; 55/401; 55/402; 55/403; 55/404; 55/405; 55/406; 55/407; 55/408; 55/409

(58) Field of Classification Search  
CPC ........ B01D 45/14; B01D 45/16; B01D 45/12; B04C 5/13; B04C 5/04  
USPC ................ 55/317, 447, 459.1, 456, 400–409; 95/270  
See application file for complete search history.

(56) References Cited

U.S. PATENT DOCUMENTS 5,244,479 A * 9/1993 Dean et al. ...................... 96/174

FOREIGN PATENT DOCUMENTS

| DE | 2037366 | 8/1969 | ............. B04B 1/04 |
| EP | 0286160 | 10/1988 | ............. B01D 45/14 |
| GB | 604927 | 7/1948 | |
| WO | WO9423823 | 10/1994 | ............. B01D 45/14 |
| WO | WO9744117 | 11/1997 | ............. B01D 45/14 |
| WO | WO2004070297 | 8/2004 | ................ F25J 3/06 |
| WO | WO2005118110 | 12/2005 | ............. B01D 45/14 |
| WO | WO2006087332 | 8/2006 | ............. B01D 53/24 |
| WO | WO2007097621 | 8/2007 | ............. B01D 45/14 |
| WO | WO2008082291 | 7/2008 | ............. B01D 45/15 |

* cited by examiner

*Primary Examiner* — Jason M Greene  
*Assistant Examiner* — Dung H Bui

(57) ABSTRACT

A separation device for removing at least part of a liquid from a mixture which comprises a gas and the liquid in the form of droplets, comprises:

a) a housing comprising first, second and third separation sections for separating liquid from the mixture, wherein the second section is arranged below the first section and above the third section, the respective sections are in communication with each other, and the second section comprises a rotating coalescer element;

b) tangentially arranged means to introduce the mixture into the first section;

c) means to remove liquid from the first section;

d) means to remove liquid from the third section; and e) means to remove a gaseous stream, lean in liquid, from the third section.

A separation process for removing at least part of a liquid from a mixture comprising the liquid in the form of droplets using the separation device.

14 Claims, 3 Drawing Sheets

SEPARATION DEVICE FOR REMOVING LIQUID FROM A MIXTURE COMPRISING A GAS AND LIQUID

CROSS REFERENCE TO EARLIER APPLICATIONS

The present application is a national stage application of International application No. PCT/EP2010/055614, filed 27 Apr. 2010, which claims priority from European Applications 09159088.5 and 09159097.6, both filed 29 Apr. 2009, both of which are incorporated herein by reference.

FIELD OF THE INVENTION

The present invention relates to a separation device for removing at least part of a liquid from a mixture which comprises a gas and the liquid in the form of droplets.

BACKGROUND OF THE INVENTION

Gas streams produced from subsurface reservoirs such as natural gas, associated gas and coal bed methane or from (partial)oxidation processes, usually contain in addition to the gaseous product concerned such as methane, hydrogen and/or nitrogen gaseous contaminants such as carbon dioxide, hydrogen sulphide, carbon oxysulphide, mercaptans, sulphides and aromatic sulphur containing compounds in varying amounts. For most of the applications of these gas streams, the contaminants need to be removed, either partly or almost completely, depending on the specific contaminant and/or the use. Often, the sulphur compounds need to be removed into the ppm level, carbon dioxide sometimes into the ppm level, e.g. LNG applications, or down to 2 or 3 vol. percent, e.g. for use as heating gas. Higher hydrocarbons may be present, which, depending on the use, may be recovered.

A way to remove such gaseous contaminants is to liquefy them and to remove the liquid so obtained by means of a liquid/gas separation method.

In WO 2008/082291 A1 and WO 2005/118110 A1, separation devices have been described for removing liquefied contaminants, such as carbon dioxide and hydrogen sulphide, from a natural gas stream. Said separation devices comprise a normally horizontal centrifugal separator to establish the separation of the liquefied contaminants from the gas stream to obtain a contaminants-enriched liquid phase and a contaminants-depleted gaseous phase.

A disadvantage of these known separation devices is, however, that there is still considerable room for improving the efficiency of removing the liquefied contaminants from the feed stream, ensuring that levels can be reached that are close to the thermodynamic prediction for the degree of condensation of the contaminants. Also, there is room for improvement of the liquid handling system, ensuring a more compact, lighter weight, minimal footprint, separation device.

SUMMARY OF THE INVENTION

An object of the present invention is to provide a device which displays an improved separation efficiency in terms of separating liquefied contaminants such as carbon dioxide and hydrogen sulphide from a feed stream. Another object is to provide an improved, more compact internal liquid handling system.

Surprisingly, it has now been found that this can be established when use is made of a separation device comprising a particular cascade of separation sections.

BRIEF DESCRIPTION OF THE DRAWINGS

For a more detailed understanding of the present invention, reference is made to the accompanying drawings, wherein.

DETAILED DESCRIPTION OF THE PREFERRED EMBODIMENTS

Figure 1:
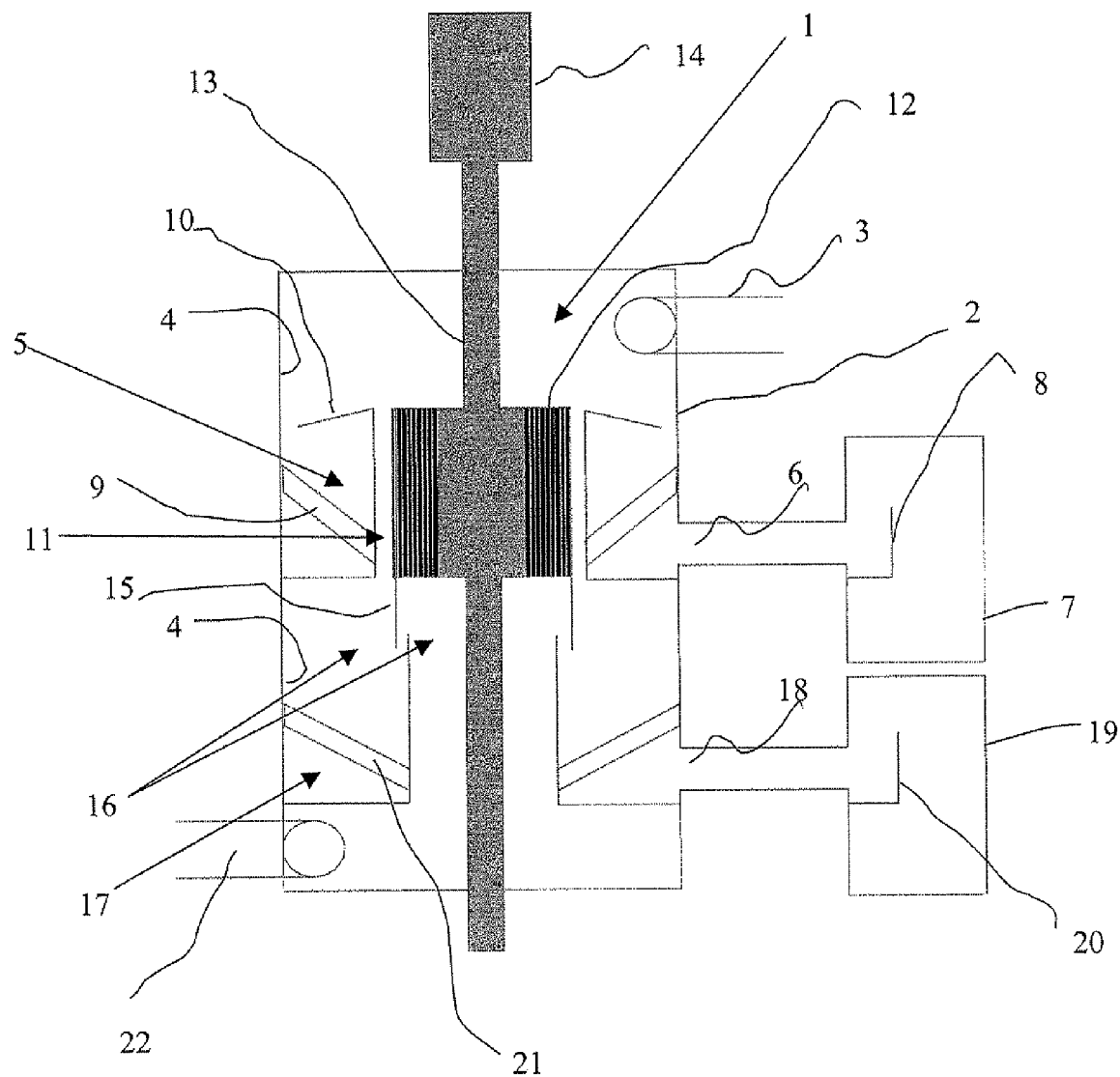
FIG. 1 is a schematic illustration of a system in accordance with a first embodiment of the invention.

Accordingly, the present invention provides a separation device for removing at least part of a liquid from a mixture which comprises a gas and the liquid in the form of droplets, which separation device comprises:

a) a housing comprising a first, second and third separation section for separating liquid from the mixture, wherein the second separation section is arranged below the first separation section and above the third separation section, the respective separation sections are in communication with each other, and the second separation section comprises a rotating coalescer element;

b) tangentially arranged inlet means to introduce the mixture into the first separation section;

c) means to remove liquid from the first separation section;

d) means to remove liquid from the third separation section; and e) means to remove a gaseous stream, lean in liquid, from the third separation section.

The separation device according to the present invention displays an excellent efficiency in removing liquefied contaminants such as carbon dioxide and hydrogen sulphide from a feed stream such as a natural gas stream, a syngas stream or a flue gas stream. Moreover, the present separation device constitutes a highly attractive more compact internal liquid handling system.

Preferably, the first separation section comprises an axial cyclone.

The tangentially arranged inlet means ensures that the mixture is introduced tangentially into the first separation section, causing the mixture to swirl inside the first separation section, as will be understood by the skilled person.

The rotating coalescer element to be used in accordance with the present invention preferably comprises an assembly of channels to separate droplets from the mixture.

Suitable rotating coalescer elements to be used in accordance with the present invention have as such, for instance, been described in WO 2008/082291, WO 2006/087332, WO 2005/118110, WO 97/44117, WO 2007/097621 and WO 94/23823, which documents are hereby incorporated by reference.

The rotating coalescer element can have many forms which are known per se and may, for example, consist of a bed of layers of gauze, especially metal or non-metal gauze, e.g. organic polymer gauze, or a layer of vanes or a layer of structured packing. Also unstructured packings can be used and also one or more trays may be present. Flow in the radial direction may be possible or may be restricted due to the use of discrete channels that can be positioned in parallel or close to parallel to the centre of rotation. Optionally, a layer with a higher resistance against flow may be present at any position in the flow direction in or onto the coalescer element, the purpose of this layer being an improvement of the flow distribution over the horizontal inlet plane of the coalescer element and preventing circulating flows. All these sorts of coalescers have the advantage of being commercially available, or can be manufactured by known techniques, and display operating efficiently in the second separation section according to the invention.

Preferably, the rotating coalescer element is an assembly of discrete channels that allow a main flow direction parallel to or diverging from the centre of rotation. Alternatively, the rotating coalescer element is a bed of one or more layers of gauze, especially metal or non-metal gauze, e.g. organic polymer gauze, which allows flow of liquid and gas in the radial direction as well.

The rotating coalescer element to be used in accordance with the present invention preferably comprises an assembly of channels to separate droplets from the mixture.

Preferably, the rotating coalescer element comprises a bundle of parallel channels that are arranged within a spinning tube parallel to an axis of rotation of the spinning tube.

Preferably, the assembly of channels or the spinning tube of the rotating coalescer element is arranged around a shaft which rotates the rotating coalescer element, which rotating coalescer element has an outer wall and an inner wall which is attached to the shaft, wherein the ratio of the outer radius of the rotating coalescer element (Ro) and the inner radius of the rotating coalescer element (Ri) is between 1.1 and 15 (Ro/Ri), preferably between 2 and 3 (Ro/Ri).

Preferably, the ratio of the inner radius (Ri) and the shaft radius (Rs) is between 1 and 5, preferably between 1 and 2 (Ri/Rs).

Preferably, the rotating coalescer element to be used in accordance with the present invention comprises a plurality of ducts over a part of the length of the axis of the housing, which ducts have been arranged around a central axis of rotation, which rotating coalescer element comprises a plurality of perforated discs wherein the perforations of the discs form the ducts.

It will be appreciated that the discs can be easily created by drilling or cutting a plurality of perforations into the relatively thin discs. By attaching several discs together these discs form a separating body. By aligning the perforations ducts are obtained.

It is now also very easy to attach the discs such that the perforations are not completely aligned. By varying the number and nature of the non-alignment of the perforations the resulting ducts can be given any desired shape. In such cases not only ducts are obtainable that are not completely parallel to the central axis of rotation, but also ducts that form a helix shape around the axis of rotation. So, in this way very easily the preferred embodiment of having non-parallel ducts can be obtained. Hence it is preferred that the perforations of the discs have been arranged such that the ducts are not parallel to the central axis of rotation or form a helix shape around the axis of rotation.

Further, it will be appreciated that it is relatively easy to increase or decrease the diameter of the perforations. Thereby the skilled person has an easy manner at his disposal to adapt the (hydraulic) diameter of the ducts, and thereby the Reynolds number, so that he can easy ascertain that the flow in the ducts is laminar or turbulent, just as he pleases, or ensure that a certain distribution of flow over the plane perpendicular to the flow direction is obtained. The use of these discs also enables the skilled person to vary the diameter of the duct along the axis of the housing. The varying diameter can be selected such that the separated liquid or solid contaminants that are collected against the wall of the duct will not clog up the duct completely, which would hamper the operation of the apparatus.

The skilled person is also now enabled to maximise the porosity of the separating body. The easy construction of the discs allows the skilled person to meticulously provide the disc with as many perforations as he likes. He may also select the shape of the perforations. These may have a circular cross-section, but also square, pentagon, hexagon, octagon or oval cross-sections are possible. He may therefore minimise the wall thickness of the separating body and the wall thicknesses of the ducts. He is able to select the wall thicknesses and the shape of the ducts such that the surface area that is contributed to the cross-section of the separating body by the walls is minimal. That means that the pressure drop over the separating body can be minimised.

The apparatus can have a small or large number of ducts. Just as explained in the prior art apparatuses the number of ducts suitably ranges from 100 to 1,000,000, preferably from 500 to 500,000. The diameter of the cross-section of the ducts can be varied in accordance with the amount of gas and amounts and nature, e.g., droplet size distribution, of contaminants and the desired contaminants removal efficiency. Suitably, the diameter is from 0.05 to 50 mm, preferably from 0.1 to 20 mm, and more preferably from 0.1 to 5 mm. By diameter is understood twice the radius in case of circular cross-sections or the largest diagonal in case of any other shape.

The rotating coalescer element according to the present invention may suitably have a radial length ranging from 0.1 to 5 m, preferably from 0.2 to 2 m. The axial length ranges conveniently from 0.1 to 10 m, preferably, from 0.2 to 5 m.

The number of discs may also vary over a large number. It is possible to have only two discs if a simple separation is needed and/or when the perforations can be easily made. Other considerations may be whether parallel ducts are desired, or whether a uniform diameter is wanted. Suitably the number of discs varies from 3 to 1000, preferably from 4 to 500, more preferably from 4 to 40. When more discs, are used the skilled person will find it easier to gradually vary the diameter of the ducts and/or to construct non-parallel ducts. Moreover, by increasing or decreasing the number of discs the skilled person may vary the duct length. So, when the conditions or the composition of the gas changes, the skilled person may adapt the duct length easily to provide the most optimal conditions for the apparatus of the present invention. The size of the discs is selected such that the radial diameter suitably ranges from 0.1 to 5 m, preferably from 0.2 to 2 m. The axial length of the discs may be varied in accordance with construction possibilities, desire for varying the shape etc. Suitably, the axial length of each disc ranges from 0.001 to 0.5 m, preferably from 0.002 to 0.2 m, more preferably from 0.005 to 0.1 m.

Although the discs may be manufactured from a variety of materials, including paper, cardboard, and foil, it is preferred to manufacture the discs from metal or ceramics. Metal discs have the advantage that they can be easily perforated and be combined to firm sturdy separating bodies. Dependent on the material that needs to be purified a suitable metal can be selected. For some applications carbon steel is suitable whereas for other applications, in particular when corrosive materials are to be separated, stainless steel may be preferred. Ceramics have the advantage that they can be extruded into the desired form such as in honeycomb structures with protruding ducts.

Typically, the ceramics precursor material is chosen to form a dense or low-porosity ceramic. Thereby the solid or liquid contaminants are forced to flow along the wall of the ducts and not, or hardly, through the ceramic material of the walls. Examples of ceramic materials are silica, alumina, zirconia, optionally with different types and concentrations of modifiers to adapt its physical and/or chemical properties to the gas and the contaminants.

The discs may be combined to a separating body in a variety of ways. The skilled person will appreciate that such may depend on the material from which the discs have been manufactured. A convenient manner is to attach the discs to a shaft that provides the axis of rotation. Suitable ways of combining the discs include clamping the discs together, but also gluing them or welding them together can be done. Alternatively, the discs may be stacked in a cylindrical sleeve. This sleeve may also at least partly replace the shaft. This could be convenient for extruded discs since no central opening for the shaft would be required. It is preferred to have metal discs that are welded together.

In a suitable embodiment of the present invention, the rotating coalescer element is present over the whole cross-section of the second separation section.

The second separation section of the present separation device may comprise a second rotating coalescer element, suitably also over the whole cross-section of the second separation section. This has the advantage that further droplets can be removed from the mixture in the second separation section. Preferably, the second rotating coalescer is a bed of one or more layers of gauze, especially metal or non-metal gauze, e.g. organic polymer gauze. In case use is made of a sequence of two rotating coalescer elements an interstage liquid collecting means will be applied.

Preferably, the rotating coalescer element comprises a guiding means for guiding liquid from the downstream part of the coalescer element into a means for collecting liquid. Suitably, such guiding means is a sleeve which extends downwardly from the outer circumference of the rotating coalescer element. More preferably, such a sleeve has a radius with respect to the shaft which is larger than the outer radius of the rotating coalescer element (Ro). Alternatively, no open channels are present in the outer 0.1-20% portion of the outer radius of the coalescer element.

Suitably, at the end part of the rotating coalescer element the sleeve is connected to the coalescer element by means of a connection part which extends in outward direction from the shaft. Suitably, the connection part has a slightly curved form. Preferably, the connection part forms part of the sleeve.

Suitably, the sleeve is fixed at a vertical position near the bottom of the coalescer element, e.g., fixed to the bottom of the collection ring of the first separation section, thus allowing guiding liquid from the downstream part of the coalescer element into a means for collecting liquid via this static sleeve.

Preferably, the sleeve has a diverging shape in the flow direction to enhance the centrifugal liquid propulsion into the inner collecting ring of the third separation section.

Suitably, the static or rotating extended sleeve is provided with passage means to enable liquid passage through the sleeve body material, e.g., holes, porous sections or straight or curved slits. These means allow the liquid to enter effectively into the lower collection ring prior to reaching the downstream end of the sleeve. Any gas that also may flow through the passage means can flow back into the main gas flow through a gap between the sleeve and the collection ring. Suitably, to prevent re-entrainment of liquid into the gas stream, means, e.g., a mistmat, are installed such that any gas that enters the collection ring has to flow through the mistmat to reach the main gas stream.

Suitably, the downstream end of the sleeve is provided with baffles to guide liquid away from the lower liquid collection ring, or, when liquid has been removed through the above mentioned slits, holes or porous section, guides the gas away from the lower liquid collection ring.

Suitably, means are installed on the shaft in the first and/or third separation section to establish rotation of the mixture in the first separation section and/or third separation section. Suitably, such means comprise a number of vanes that are attached to the shaft.

Preferably, the means to remove liquid from the first separation section and the means to remove liquid from the third separation section comprise inner collecting rings.

The inner collecting ring to be used in the first separation section comprises a cap covering part of the upper section of the inner collecting ring, which cap forms part of the bottom of the first separation section. Preferably, the cap has a diverging shape in the direction of the collecting ring. More preferably, the angle of the cap with respect to the shaft of the separation device is in the range of from 90 to 45°, preferably 88 to 75°.

Suitably, the means to remove liquid from the first separation section and the means to remove liquid from the third separation section comprise an outlet for withdrawing liquid from the separation device.

Suitably, said outlets communicate with one or more liquid collecting vessels.

Preferably, the liquid collecting vessels comprise a weir device for regulating the liquid flow and level through the outlet and/or regulating liquid levels and/or ensuring a liquid seal in the means to remove liquid from the first separation section and the means to remove liquid from the second separation section. The function of the weir in the liquid collecting vessels is to ensure a liquid seal that prevents gas from flowing from the separator into the collecting vessel, independent of the actual liquid flow rate towards the liquid collecting vessels. Even if the liquid flow at some point in time would be nil, the stagnant liquid pool in the nozzle and weir would still function as a seal. Excessive gas circulation between separator and liquid collecting vessels would result in an increase of heat influx and evaporation of condensed contaminants, which would result in a lower overall performance.

Preferably, the liquid phase collecting vessels comprise means to equalise the pressure in the separating device and the liquid collecting vessels. Such means suitably comprise ducts that allow gas flow to and from the first or third separation section.

Preferably, the shaft extends via the first, second and third separation sections to a bottom part of the housing or the shaft extends via the first and second separation section to a bottom part of the rotating coalescer element. More preferably, the shaft extends to below the bottom part of the coalescer element with gradually increasing diameter to an extend that it guides the gas flow from an axial direction to a radial direction, which allows a radial outlet of gas just below the coalescer element, preferably just below the guiding means for guiding liquid into the inner collecting rings of the third separation section. Alternatively, part of the lower section of the shaft, below the coalescer element, is disconnected from the upper section and static.

Preferably, the means to remove liquid from the first separation section and the means to remove liquid from the third separation section comprise a device for passing liquid to a liquid collecting section which is arranged below the third separation section, which liquid collecting section communicates with the first and/or third separation section and comprises an outlet for withdrawing liquid from the housing. Such a device for passing liquid to the liquid collecting section preferably comprises a vertically arranged conduct that extends from the separation section concerned into the liquid collecting section.

Suitably, the rotating coalescer element comprises means to direct liquid into the inner collecting ring of the third separation section.

Preferably, the ratio of the outer radius of the first separation section (Ro1) and the outer radius of the rotating coalescer element (Ro2) is between 1 and 2, preferably between 1.05 and 1.2 (Ro1/Ro2).

Preferably, the ratio of the outer radius of the third separation section (Ro3) and the outer radius of the rotating coalescer element (Ro2) is between 1 and 2, preferably between 1.05 and 1.2. (Ro3/Ro2).

Suitably, the shaft is coupled to a motor for rotating the rotating coalescer element.

Preferably, in the inner collecting ring(s) a baffle is arranged to reduce the liquid tangential velocity. This may reduce re-entrainment of collected liquid into a gas stream, thus, improving the overall liquid removal efficiency. Also, it may improve the flow of collected liquid into a nozzle for transporting liquid from the collecting ring to any other section inside or outside the separator.

In a preferred embodiment of the present invention the third separation section comprises a diffuser section. The diffusor section serves to collect the gas stream that exits from the bottom of the coalescer element and is designed such that a smooth flow pattern is sustained. Preferably, the gas collecting channel accommodates exactly the cumulative volume of gas exiting the coalescer element, as known to e.g. people skilled in the art of pump or blower technology. This cumulative volume approach also allows for space for guiding ducts from liquid collecting devices located above the diffusor section. These ducts allow for liquid collecting in the bottom part of the housing. Preferably, the diffuser section comprises a gas collecting duct and an outlet for withdrawing a gaseous stream lean in liquid from the housing. Preferably, the width of the gas collecting duct increases in the direction of the outlet for withdrawing the gaseous stream.

In a preferred embodiment of the present invention, the length of the channels in the rotating coalescer element decreases in the direction of the outer radius of the rotating coalescer element.

Preferably, the separation device according to the present invention comprises a flow sensor which is arranged in or upstream of the tangentially arranged inlet means for introducing the mixture in the first separation section, which flow sensor controls the electric motor and thus the rotating speed of the coalescer element. In this way, the rotating speed of the coalescer element in step 3) is made dependent of the rotating speed of the mixture which is introduced into the first separation zone in step 1).

The invention further provides using the separation device in a process for removing at least part of a liquid from a mixture which comprises a gas and the liquid in the form of droplets, the process comprising:
1) introducing the mixture tangentially into a first separation section of the separation device, in which liquid is separated from the gas;
2) removing separated liquid as obtained in step 1) from the first separation section;
3) allowing the remaining mixture of the liquid in the form of droplets and the gas as obtained in step 2) to enter a second separation section of the separation device, which second separation section comprises a rotating coalescer element in which further liquid is separated from the gas;
4) allowing the remaining mixture of the liquid in the form of droplets and the gas as obtained in step 3) to enter a third separation zone of the separation device, in which further liquid is separated from the gas.;
5) removing the separated liquid as obtained in step 4) from the third separation section; and
6) removing from the third separation section a gaseous phase lean in liquid.

Suitably, in step 1) of the present process liquid is separated from the gas by migrating droplets under application of a centrifugal force to an inner wall of the third separation section, via which inner wall liquid is removed from the separation device in step 2) or passed to a liquid collecting section which is arranged below the third separation section.

Preferably, in step 1) of the present process liquid is separated from the gas by migrating the droplets under application of a centrifugal force to an inner wall of the first separation section, via which inner wall liquid is passed to a liquid collecting section which is arranged below the third separation section.

Suitably, in step 4) of the present process liquid is separated from the gas by migrating droplets under application of a centrifugal force to an inner wall of the third separation section, via which inner wall liquid is removed from the separation device in step 5) or passed to a liquid collecting section which is arranged below the third separation section.

Preferably, in step 4) of the present process liquid is separated from the gas by migrating droplets under application of a centrifugal force to an inner wall of the third separation section, via which inner wall liquid is passed to a liquid collecting section which is arranged below the third separation section.

Preferably, the pressure in the first separation section is higher than the pressure in the third separation section.

When use is made of a liquid collecting section which is arranged below the third separation section, the present process suitably comprises the steps of:
1) introducing the mixture tangentially into a first separation section of a separation device, in which liquid is separated from the gas;
2) removing separated liquid as obtained in step 1) from the first separation section;
3) allowing the remaining mixture of the liquid in the form of droplets and the gas as obtained in step 2) to enter a second separation section of the separation device, which second separation section comprises a rotating coalescer element in which further liquid is separated from the gas;
4) allowing the remaining mixture of the liquid in the form of droplets and the gas as obtained in step 3) to enter a third separation zone of the separation device, in which further liquid is separated from the gas;
5) removing the separated liquid as obtained in step 4) from the third separation section;
6) removing from the third separation section a gaseous phase lean in liquid;
7) collecting liquid as removed in step 2) and step 5) in a liquid collecting section which is arranged below the third separation section, in which liquid collecting section pressure compensation takes place by maintaining liquid head in the means, preferably conducts, that are used to remove liquid in step 2) and step 5); and
8) removing from the a bottom part of the liquid collecting section liquid.

Suitably, in step 1) and/or step 4) of the present process the centrifugal force is generated by a swirling flow of the mixture or the remaining mixture comprising the liquid in the form of droplets and the gas.

Preferably, the mixture that is introduced into the first separation section in step 1) has a swirling flow.

Suitably, the average particle size of the droplets that are separated from the gas in step 1) is larger than the average particle size of the droplets that are separated from the gas phase in step 3).

Suitably, the average particle size of the droplets that are separated from the gas in step 3) is smaller than the average particle size of the droplets that are separated from the gas in step 4).

The average particle size of the droplets that are separated from the gas in step 1) is in the range of from 15-200 micrometer.

Suitably, the stream velocity of the mixture in the first separation section is lower than the stream velocity of the remaining mixture in the second separation section.

Suitably, the rotating coalescer element rotates at a speed of between 100 and 3000 rpm, preferably at a speed of between 1000 and 2000 rpm. The actual rotational speed may be chosen such that the ratio of rotational speed in the third separation section and the first separation section 1 is in the range of 1 to 20, preferably in the range of 1 to 10. This ratio may be set by the proper choice of size of the tangentially arranged inlet means for introducing the mixture into the first separation section and the rotational speed of the coalescer element, depending on the actual volumetric flow rate and mass density of the mixture.

Preferably, the rotating speed of the coalescer element in step 3) is made dependent of the rotating speed of the mixture which is introduced into the first separation zone in step 1). This can, for instance, be established by means of a flow sensor which is arranged in the tangentially arranged inlet means for introducing the mixture in the first separation section, which flow sensor controls the electric motor and thus the rotating speed of the coalescer element.

In a preferred embodiment of the invention, the gaseous phase lean in liquid as obtained in step 6) of the present process is further purified, e.g. by extraction of remaining acidic components with a chemical solvent, e.g. an aqueous amine solution, especially aqueous ethanolamines, such as DIPA, DMA, MDEA, etc., or with a physical solvent, e.g. cold methanol, DEPG, NMP, etc.

Suitably, the mixture from which the liquid is to be removed is continuously provided, continuously cooled and continuously separated.

Suitably, the gas in the mixture comprises a natural gas, a syngas or a flue gas and the liquid in the form of droplets comprises carbon dioxide carbon monoxide and/or hydrogen sulphide and mixtures thereof with various hydrocarbons.

The mixture may be a gas stream from a (partial) oxidation process which comprises carbon dioxide as the liquefied gaseous contaminant.

The natural gas stream suitably comprises between 0.1 and 60 vol % of hydrogen sulphide, preferably between 20 and 40 vol % of hydrogen sulphide. The natural gas stream suitably comprises between 1 and 90 vol % of carbon dioxide, preferably between 5 and 80 vol % of carbon dioxide.

The natural gas stream to be used in accordance with the present invention suitably comprises between 20 and 80 vol % of methane.

In order to make sure that contaminants such as carbon dioxide and hydrogen sulphide are liquefied and present in the form of droplets, the mixture to be introduced into the first separation section in step 1) is suitably derived from the corresponding raw feed gas stream, which raw feed gas stream is cooled to ensure that contaminants will be in the form of droplets. The raw feed gas stream may be externally cooled or in the case that the pressure of the feed gas stream is sufficiently high, cooling may be obtained by expansion of the raw feed gas stream. Combinations may also be possible. A suitable method to cool the raw feed gas stream is by nearly isentropic expansion, especially by means of an expander, preferably a turbo expander or laval nozzle. Another suitable method is to cool the raw feed gas stream by isenthalpic expansion, preferably isenthalpic expansion over an orifice or a valve, especially over a Joule-Thomson valve.

In a preferred embodiment the raw feed gas stream is pre-cooled before expansion. This may be done against an external cooling loop or against a cold internal process stream, e.g. liquid acidic contaminant. Preferably the gas stream is pre-cooled before expansion to a temperature between 25 and −30° C., preferably between 15 and −10° C. Especially when the feed gas stream has been compressed, the temperature of the feed gas stream may be between 100 and 150° C. In that case air or water cooling may be used to decrease the temperature first, optionally followed by further cooling.

Another suitable cooling method is heat exchange against a cold fluidum, especially an external refrigerant, e.g. a propane cycle, an ethane/propane cascade or a mixed refrigerant cycle, optionally in combination with an internal process loop, suitably a contaminants stream (liquid or slurry), a cold methane enriched stream.

Suitably, the mixture which is introduced in step 1) in the first separation section has a temperature between −30 and −80° C., preferably between −40 and −65° C. At these temperatures contaminants such as carbon dioxide and hydrogen sulphide will at least partly be present in the form of droplets.

The raw feed gas stream may be pre-treated to partially or completely remove water and optionally some heavy hydrocarbons. This can be for instance done by means of a pre-cooling cycle, against an external cooling loop or a cold internal process stream. Water may also be removed by means of a pre-treatment with molecular sieves, e.g. zeolites, or silica gel or alumina oxide or other drying agents such as glycol, MEG, DEG or TEG, or glycerol. The amount of water in the feed gas stream is suitably less than 1 vol %, preferably less than 0.1 vol %, more preferably less than 0.0001 vol %.

The raw feed gas stream, and in particular natural gas streams produced from a subsurface formation, may typically contain water. In order to prevent the formation of gas hydrates in the present process, at least part of the water is suitably removed. Therefore, the gas stream that is used in the present process has preferably been dehydrated. Conventional processes can do this. A suitable process is the one described in WO-A 2004/070297. Other processes for forming methane hydrates or drying natural gas are also possible. Other dehydration processes are also possible, including treatment with molecular sieves or drying processes with glycol or methanol. Suitably, water is removed until the amount of water in the gas stream comprises at most 50 ppmw, preferably at most 20 ppmw, more preferably at most 1 ppmw of water, based on the total gas stream.

The gas phase that is obtained in step 6) can be used as product. It is also possible that it is desirable to subject the recovered sweet hydrocarbon gas after step 6) to further treatment and/or purification. For instance, the sweet hydrocarbon gas may be subjected to fractionation. Further purification may be accomplished by absorption with an alkanolamine fluid, optionally in combination with a sulphone, such as tetramethylene sulphone (sulpholane), with N-methyl pyrrolidone, or with methanol. Other treatments may include a further compression, when the sweet gas is wanted at a higher pressure.

Figure 2:
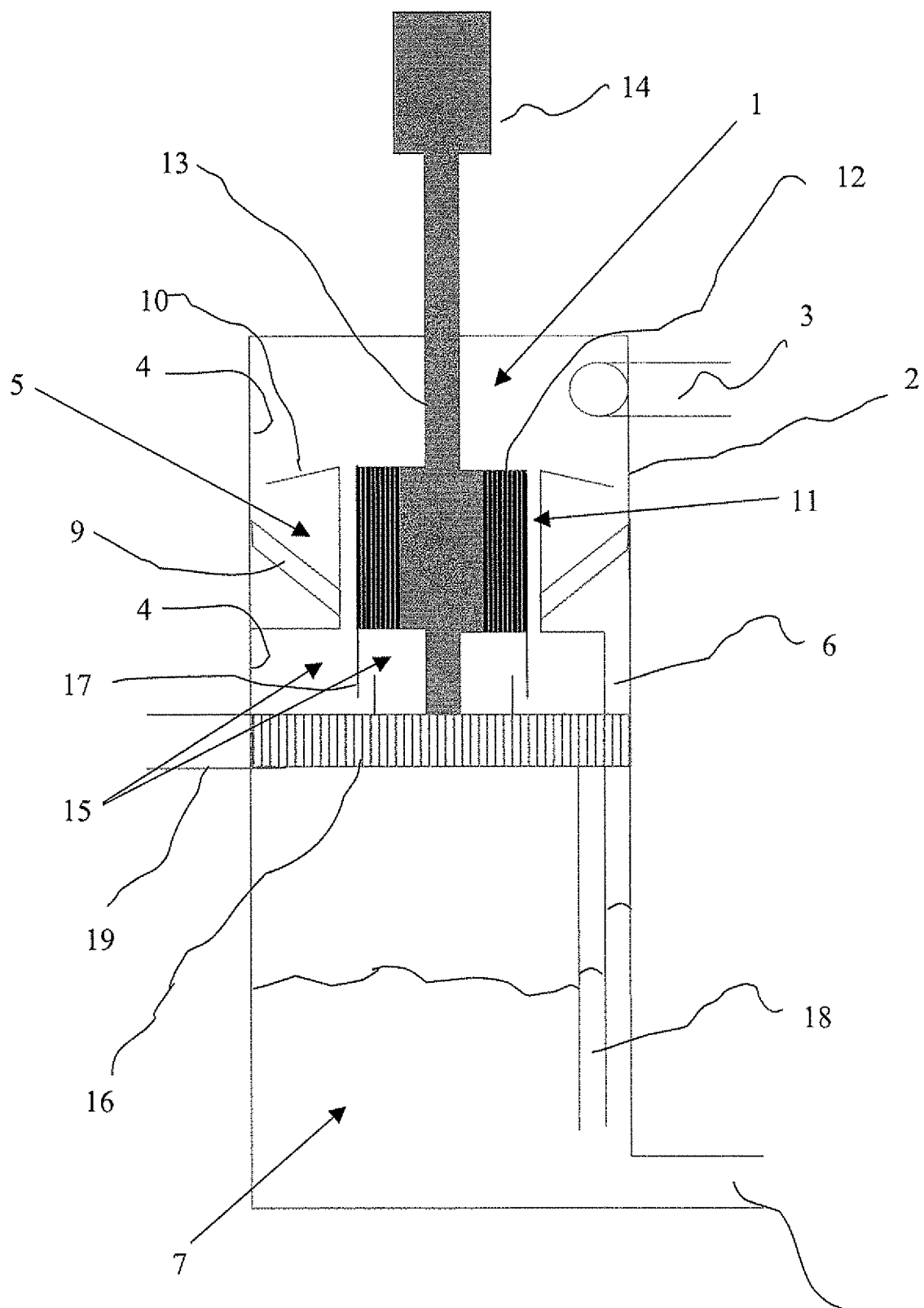
FIG. 2 is a schematic illustration of a system in accordance with a first embodiment of the invention.
Figure 3:
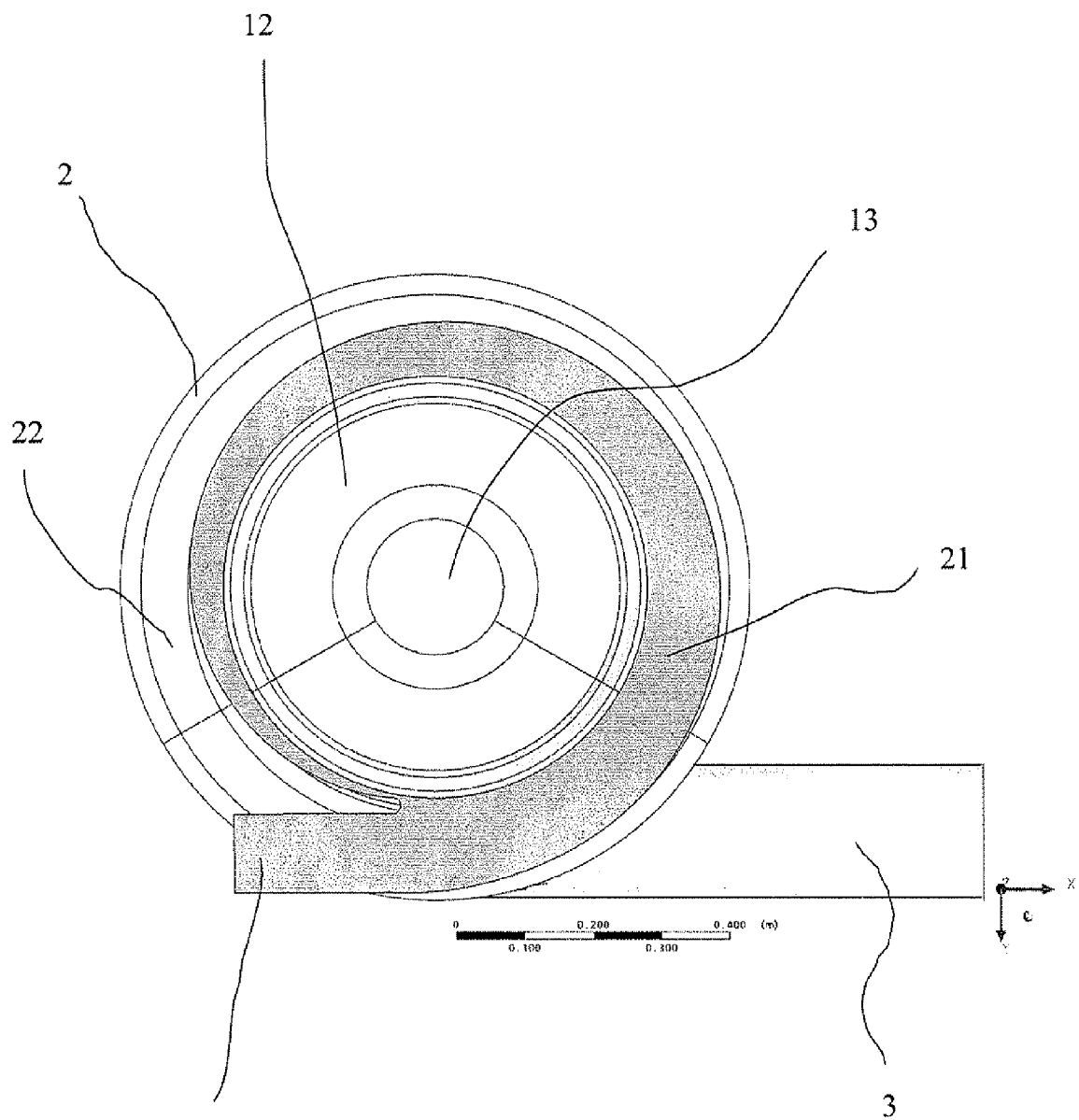
FIG. 3 is a schematic cross-section of the housing shown in FIG. 2

The invention will be further illustrated by means of FIGS. 1-3.

Referring to FIG. 1, a natural gas containing liquid components is introduced into a first separation section 1 of a housing 2 by means of tangentially arranged inlet means 3. In the first separation section 1 the liquid contained in the natural gas is separated from the gas by migrating droplets under application of a centrifugal force to an inner wall 4 of the first separation section 1. Via the inner wall 4 liquid is passed to an inner collecting ring 5 which comprises an outlet 6 for withdrawing liquid from the housing 2 to a liquid collecting vessel 7 which contains a weir 8 to ensure a liquid seal which prevents gas from flowing from the housing 2 towards the liquid collecting vessel 7. The inner collecting ring 5 is provided with a baffle 9 to reduce the liquid tangential velocity, thus reducing re-entrainment of collected liquid into the gas stream, resulting in an improved overall liquid removal efficiency. The inner collecting ring 5 is provided with a cap 10 to reduce contact between the collected liquid inside the inner collecting ring 5 and the swirling gas/liquid mixture above the ring, thus preventing re-entrainment of liquid into the swirling gas/liquid mixture. The remaining natural gas/liquid mixture is then passed through a second separation section 11, which comprises a coalescer element 12 which rotates on a shaft 13 which is connected to an electric motor 14. The shaft 13 extends to the bottom part of the housing 2. From the bottom of the coalescer element 12 liquid is then introduced together with the remaining gas/liquid mixture into a third separation section 16 where further liquid is separated from the gas by migrating droplets under application of centrifugal force via extended sleeve 15 to the inner wall 4 of the housing 2. Via the inner wall 4 liquid is passed to an inner collecting ring 17 which comprises an outlet 18 for withdrawing liquid from the housing 2 to a liquid collecting vessel 19 which contains a weir 20 to ensure a liquid seal which prevents gas from flowing from the housing 2 towards the liquid collecting vessel 19. The inner collecting ring 17 is provided with a baffle 21 to reduce the liquid tangential velocity, thus reducing re-entrainment of collected liquid into the gas stream, resulting in an improved overall liquid removal efficiency. By means of an outlet means 22 a gas stream is then removed from the bottom part of the housing 2 which gas stream is lean in liquid.

Referring to FIG. 2, a natural gas containing liquid components is introduced into a first separation section 1 of a housing 2 by means of tangentially arranged inlet means 3. In the first separation section 1 the liquid contained in the natural gas is separated from the gas by migrating droplets under application of a centrifugal force to an inner wall 4 of the first separation section 1. Via the inner wall 4 liquid is passed to an inner collecting ring 5 which comprises a duct 6 for guiding the collected liquid from the inner collecting ring 5 to a liquid collecting section 7. To ensure a liquid seal which prevents gas from flowing from the separation section 1 towards the liquid collecting section 7 the duct 6 extends to close to the bottom of the liquid collecting section 7. The inner collecting ring 5 is provided with a baffle 9 to reduce the liquid tangential velocity, thus reducing re-entrainment of collected liquid into the gas stream, resulting in an improved overall liquid removal efficiency. The inner collecting ring 5 is provided with a cap 10 to reduce contact between the collected liquid inside the inner collecting ring 5 and the swirling gas/liquid mixture above the ring, thus preventing re-entrainment of liquid into the swirling gas/liquid mixture. The remaining natural gas/liquid mixture is then passed through a second separation section 11, which comprises a coalescer element 12 which rotates on a shaft 13 which is connected to an electric motor 14. The shaft 13 extends to the bottom of the coalescer element 12 or may be extended into the diffuser section 16 or just below. From the bottom of the coalescer element 12 liquid is then introduced together with the remaining gas/liquid mixture into the third separation section 15 where further liquid is separated from the gas by migrating droplets under application of centrifugal force via extended sleeve 17 to the inner wall 4 of the housing 2. In the diffuser section 16 the gas stream that exits from the bottom of the coalescer element 12 is collected and it is designed such that a smooth flow pattern is sustained. Preferably, the gas collecting channel accommodates exactly the cumulative volume of gas exiting the coalescer element 12, as known to e.g. people skilled in the art of pump or blower technology. Via a liquid guiding duct 18 liquid passes from the third separation section 15 through diffuser section 16 to the liquid collecting section 7. A gas stream lean in liquid is removed from the third separation section 15 via outlet means 19, whereas a liquid stream is removed from the bottom part of the housing 2 by means of an outlet means 20.

In FIG. 3, a cross-section is shown of the housing 2 as depicted in FIG. 2. The natural gas containing liquid components is introduced into the first separation section of the housing 2 by means of tangentially arranged inlet means 3. The coalescer element 12 is arranged around the shaft 13 which extends to the diffuser section 16 which comprises a gas collecting duct 21 and the outlet means 19 from which a gaseous stream lean in liquid is withdrawn from the housing 2. The gas collecting duct 21 has preferably a width which increases in the direction towards the outlet means 19. Further, duct 22 is shown which guides liquid duct 18 (FIG. 2) from the third separation section 15 (FIG. 2) and liquid duct 6 (FIG. 2) from liquid collecting ring 5 (FIG. 2) to the liquid collecting section 7 at the bottom of the housing 2.

We claim:

1. A separation device for removing at least part of a liquid from a mixture which comprises a gas and the liquid in the form of droplets, which separation device comprises:
   a) a housing comprising a first, second and third separation section for separating liquid from the mixture, wherein the second separation section is arranged below the first separation section and above the third separation section, the respective separation sections are in communication with each other, and the second separation section comprises a rotating coalescer element;
   b) tangentially arranged inlet means to introduce the mixture tangentially into the first separation section, wherein in the first separation section liquid can be separated from gas by migrating droplets under application of a centrifugal force to an inner wall;
   c) means to remove liquid from the first separation section;
   d) means to remove liquid from the third separation section; and
   e) means to remove a gaseous stream, lean in liquid, from the third separation section,
   wherein the first separation section comprises an axial cyclone;
   wherein the rotating coalescer element comprises a guiding means for guiding liquid from a downstream part of the rotating coalescer element into a means for collecting liquid, the guiding means being a sleeve which extends downwardly from the outer circumference of the rotating coalescer element.

2. The separation device according to claim 1, in which the rotating coalescer element comprises an assembly of channels to separate liquid from the gaseous phase.

3. The separation device according to claim 2, in which the rotating coalescer element comprises a bundle of parallel channels that are arranged within a spinning tube parallel to an axis of rotation of the spinning tube.

4. The separation device according to claim 2, in which the rotating coalescer element comprises a plurality of ducts over a part of the length of the axis of the housing, which ducts have been arranged around a central axis of rotation, and in which the rotating coalescer element has been composed of a plurality of perforated discs wherein the perforations of the discs form the ducts.

5. The separation device according to claim 1, in which the assembly of channels or the spinning tube of the rotating coalescer element is arranged around a shaft which rotates the rotating coalescer element, which rotating coalesce element has an outer wall and an inner wall which is attached to the shaft, wherein the ratio of the outer radius of the rotating coalescer element (Ro) and the inner radius of the rotating coalesce element (Ri) is between 1.1 and 15 (Ro/Ri), preferably between 2 and 3 (Ro/Ri).

6. The separation device according to claim 5, wherein the ratio of the inner radius (Ri) and the shaft radius (Rs) is between 1 and 5.

7. The separation device according to claim 1, wherein the sleeve is fixed at a vertical position near the bottom of the coalescer element.

8. The separation device according to claim 1, in which means are installed on a shaft in the first and/or third separation section to establish rotation of the mixture in the first separation section and/or third separation section.

9. The separation device according to claim 1, in which the means to remove liquid from the first separation section and the means to remove liquid from the third separation section comprise inner collecting rings.

10. The separation device according to claim 1, in which the means to remove liquid from the first separation section and the means to remove liquid from the third separation section comprise an outlet for withdrawing liquid from the separation device.

11. The separation device according to claim 10, in which the outlets communicate with one or more liquid collecting vessels.

12. The separation device according to claim 11, in which the liquid collecting vessels comprise a weir device for regulating the flow through the outlet and/or any regulating liquid levels and/or ensuring a liquid seal in the means to remove liquid from the first separation section and the means to remove liquid from the second separation section.

13. The separation device according to claim 1, wherein a shaft extends via the first and third separation sections to a bottom part of the housing or the shaft extends via the first separation section to a bottom part of the rotating coalesce element.

14. The process for removing at least part of a liquid from a mixture which comprises a gas and the liquid in the form of droplets, in which process a separation device according to claim 1 is used, the process comprising:
  1) introducing the mixture tangentially into a first separation section of the separation device, in which liquid is separated from the gas;
  2) removing separated liquid as obtained in step 1) from the first separation section;
  3) allowing the remaining mixture of the liquid in the form of droplets and the gas as obtained in step 2) to enter a second separation section of the separation device, which second separation section comprises a rotating coalescer element in which further liquid is separated from the gas;
  4) allowing the remaining mixture of the liquid in the form of droplets and the gas as obtained in step 3) to enter a third separation zone of the separation device, in which further liquid is separated from the gas;
  5) removing the separated liquid as obtained in step 4) from the third separation section; and
  6) removing from the third separation section a gaseous phase lean in liquid.

\* \* \* \* \*